(12) United States Patent
Bakos et al.

(10) Patent No.: US 9,635,880 B2
(45) Date of Patent: May 2, 2017

(54) REDUCED-SIZE APPARATUS FOR APPLYING FOOD COATING AND METHODS OF USE THEREOF

(75) Inventors: James Bakos, Poynette, WI (US);
James Karpinsky, Poynette, WI (US);
Allen Bongert, Poynette, WI (US);
Travis Renkly, Volga, SD (US)

(73) Assignee: Vibratory Solutions, LLC, Lodi, WI (US)

( * ) Notice: Subject to any disclaimer, the term of this patent is extended or adjusted under 35 U.S.C. 154(b) by 748 days.

(21) Appl. No.: 12/913,544

(22) Filed: Oct. 27, 2010

(65) Prior Publication Data

US 2011/0097459 A1    Apr. 28, 2011

Related U.S. Application Data

(60) Provisional application No. 61/255,223, filed on Oct. 27, 2009.

(51) Int. Cl.
| | | |
|---|---|---|
| A23B 4/02 | (2006.01) | |
| A01J 27/02 | (2006.01) | |
| B65G 17/12 | (2006.01) | |
| A23P 1/08 | (2006.01) | |
| A23L 1/00 | (2006.01) | |

(52) U.S. Cl.
CPC .............. *A23P 1/082* (2013.01); *A23L 1/005* (2013.01)

(58) Field of Classification Search
CPC ................................ A23L 1/005; A23P 1/082
USPC ......... 99/494, 548–549, 567, 569, 574, 589, 99/593, 598–599; 118/24, 30, 308, 312, 118/13, 19, 31, 118, 18, 16, 27, 310, 20, 118/22, 23, 28, 603, 610, 612, 303, 409, 118/416, 57; 198/801, 629, 727, 730, 198/803.13, 842
See application file for complete search history.

(56) References Cited

U.S. PATENT DOCUMENTS

| | | | |
|---|---|---|---|
| 580,644 A | | 4/1897 | Ham |
| 2,659,338 A | | 11/1953 | Harrison |
| 2,738,765 A | * | 3/1956 | Hart .............................. 119/57.3 |
| 2,775,268 A | * | 12/1956 | Eckart ............................. 141/78 |
| 3,166,175 A | | 1/1965 | Kurtz et al. |

(Continued)

FOREIGN PATENT DOCUMENTS

| | | |
|---|---|---|
| CA | 2670805 | 1/2008 |
| GB | 2209006 | 4/1989 |
| JP | 410263521 | 10/1998 |

OTHER PUBLICATIONS

CA Office Action for CA Pat. App. No. 2719158 mailed Feb. 8, 2012.

(Continued)

*Primary Examiner* — Dana Ross
*Assistant Examiner* — Ket D Dang
(74) *Attorney, Agent, or Firm* — Craig A. Fieschko, Esq.; DeWitt Ross & Stevens S.C.

(57) ABSTRACT

A reduced-size apparatus for applying food coating that includes a belt assembly for conveying food products, having an input end and an output end, and a recycle assembly, capable of receiving excess coating from the output end of the belt assembly and conveying it to the input end, wherein the recycle assembly includes at least one of a base coating distribution passage and a top coating distribution passage for providing coating for application to a food product situated on the belt assembly.

28 Claims, 11 Drawing Sheets

(56) References Cited

U.S. PATENT DOCUMENTS

| | | | |
|---|---|---|---|
| 3,245,518 A * | 4/1966 | Reibel et al. | 198/801 |
| 3,263,592 A | 8/1966 | Hickey et al. | |
| 3,547,075 A * | 12/1970 | Johnson | 118/16 |
| 3,640,767 A | 2/1972 | Fulton et al. | |
| 3,648,596 A * | 3/1972 | Zito | 118/31 |
| 3,707,769 A | 1/1973 | Syrjanen et al. | |
| 3,762,363 A * | 10/1973 | Johnson | 118/16 |
| 3,809,132 A | 5/1974 | Jones | |
| 3,854,574 A | 12/1974 | Theijsmeijer et al. | |
| 3,869,972 A | 3/1975 | Chase | |
| 3,935,807 A * | 2/1976 | Main et al. | 99/352 |
| 3,948,493 A * | 4/1976 | Moser et al. | 366/271 |
| 4,058,083 A | 11/1977 | Miller | |
| 4,214,548 A | 7/1980 | Booth et al. | |
| 4,248,173 A * | 2/1981 | Kuhlman | 118/20 |
| 4,313,535 A | 2/1982 | Carmichael | |
| 4,777,056 A * | 10/1988 | Buhler et al. | 426/285 |
| 4,889,241 A | 12/1989 | Cogan et al. | |
| 4,936,248 A | 6/1990 | Miller | |
| RE33,542 E | 2/1991 | Musschoot | |
| 5,052,330 A | 10/1991 | Stacy | |
| 5,067,431 A | 11/1991 | Heitmiller | |
| 5,132,914 A * | 7/1992 | Cahlander et al. | 700/211 |
| 5,150,798 A | 9/1992 | Mills, Jr. | |
| 5,238,303 A | 8/1993 | Dixon | |
| 5,238,493 A | 8/1993 | Miller | |
| 5,267,672 A | 12/1993 | Jacobsen et al. | |
| 5,437,723 A | 8/1995 | Sollich | |
| 5,512,008 A | 4/1996 | Musschoot | |
| 5,555,967 A | 9/1996 | Hufford | |
| 5,643,361 A | 7/1997 | Wadell | |
| 5,728,216 A | 3/1998 | London | |
| 5,762,176 A | 6/1998 | Patterson et al. | |
| 5,868,241 A | 2/1999 | Pellegrino | |
| 5,908,117 A | 6/1999 | Stroman et al. | |
| 5,937,744 A * | 8/1999 | Nothum et al. | 99/494 |
| 6,000,320 A | 12/1999 | Herrick, IV | |
| 6,019,216 A | 2/2000 | Patterson | |
| 6,079,550 A | 6/2000 | Gilman | |
| 6,079,698 A | 6/2000 | Patterson et al. | |
| 6,117,235 A | 9/2000 | Toccaceli et al. | |
| 6,142,292 A | 11/2000 | Patterson | |
| 6,161,680 A | 12/2000 | Martin et al. | |
| 6,179,117 B1 | 1/2001 | Gilamn | |
| D443,501 S | 6/2001 | Sleppy | |
| 6,250,471 B1 | 6/2001 | Ruthven et al. | |
| 6,253,908 B1 | 7/2001 | Gilman | |
| 3,279,731 A1 | 8/2001 | Anderson | |
| 6,286,658 B1 | 9/2001 | Hufford | |
| 6,308,822 B1 | 10/2001 | Moran et al. | |
| 6,325,202 B1 | 12/2001 | Gaines | |
| 6,343,688 B1 | 2/2002 | McKinlay | |
| 6,415,913 B2 | 7/2002 | Sleppy et al. | |
| 6,457,577 B1 | 10/2002 | Ikeda et al. | |
| 6,460,680 B1 | 10/2002 | Hufford | |
| 6,486,481 B1 | 11/2002 | Tigera | |
| 6,505,547 B1 | 1/2003 | Burnett et al. | |
| 6,510,809 B2 * | 1/2003 | Kuenen | 118/13 |
| 6,631,799 B2 | 10/2003 | Samson | |
| 6,655,523 B2 | 12/2003 | Jones et al. | |
| 6,659,267 B2 | 12/2003 | Patterson | |
| 6,705,459 B1 | 3/2004 | Musschoot | |
| 6,834,756 B2 | 12/2004 | Sullivan, Jr. | |
| 6,868,960 B2 | 3/2005 | Jones | |
| 6,962,128 B2 | 11/2005 | Dove et al. | |
| 7,174,846 B2 * | 2/2007 | Zeegers et al. | 118/24 |
| 7,418,920 B2 | 9/2008 | Kuenen | |
| 7,827,929 B2 | 11/2010 | Garrison et al. | |
| 8,181,592 B2 | 5/2012 | Karpinsky et al. | |
| 2001/0051538 A1 | 12/2001 | Suzuki et al. | |
| 2002/0175051 A1 | 11/2002 | Samson | |
| 2003/0041746 A1 | 3/2003 | Schmidt | |
| 2004/0226864 A1 * | 11/2004 | Tse | 209/12.1 |
| 2005/0124013 A1 * | 6/2005 | Bonen et al. | 435/7.32 |
| 2006/0156931 A1 | 7/2006 | Mather et al. | |
| 2008/0283366 A1 * | 11/2008 | Karpinsky et al. | 198/763 |
| 2009/0007842 A1 * | 1/2009 | Stacy et al. | 118/24 |

OTHER PUBLICATIONS

US Office Action for U.S. Appl. No. 12/541,700 mailed May 16, 2012.
Office Action mailed Aug. 8, 2011 for related U.S. Appl. No. 12/271,632.
Robins Vibro Batter and Breading Machine, Robins Food Processing Machinery, A.K. Robins and Company, Incorporated, p. 230.
MP Equipment Company, Brochure, "MP Drum Breader"; http://www.mpequipment.com/products/breader_drum.html.
Meyer + Garroutte Systems, Brochure, Garroutte Closed Pocket Elevator, "Unique Conveyor Meters Product with No Spilling,"; www.meyer-industries.com.
Marchant Schmidt, Inc. Products>Products Topping Applicators. "Topping Applicator"; http://www.marchantschmidt.com/item_detail.php?id-64.
Stein Associates, Inc., Brochure, "XL Breading Machine" SP-0471-986.
Composiflex, Brochure, "Composite Springs"; www.composiflex.com.
P.J. Prause Durotec GmbH, Brochure, "Fatigue strength of S-PLY leaf springs".
Renold Ajax, Brochure, "Rotart Electric Vibrators".
Volta Belting Technology Ltd., Brochure, "SuperDrive, The Hygienic Positive-Drive Belt".
Intralox, Brochure, "Series 800".
"A composite housing with integrated performance features".
"How to select the right overhung load adaptors".
Flat-Flex, Brochure, "Mesh guide".
Eaton, Brochure, "Low speed high torque motors", Aug. 2006.

* cited by examiner

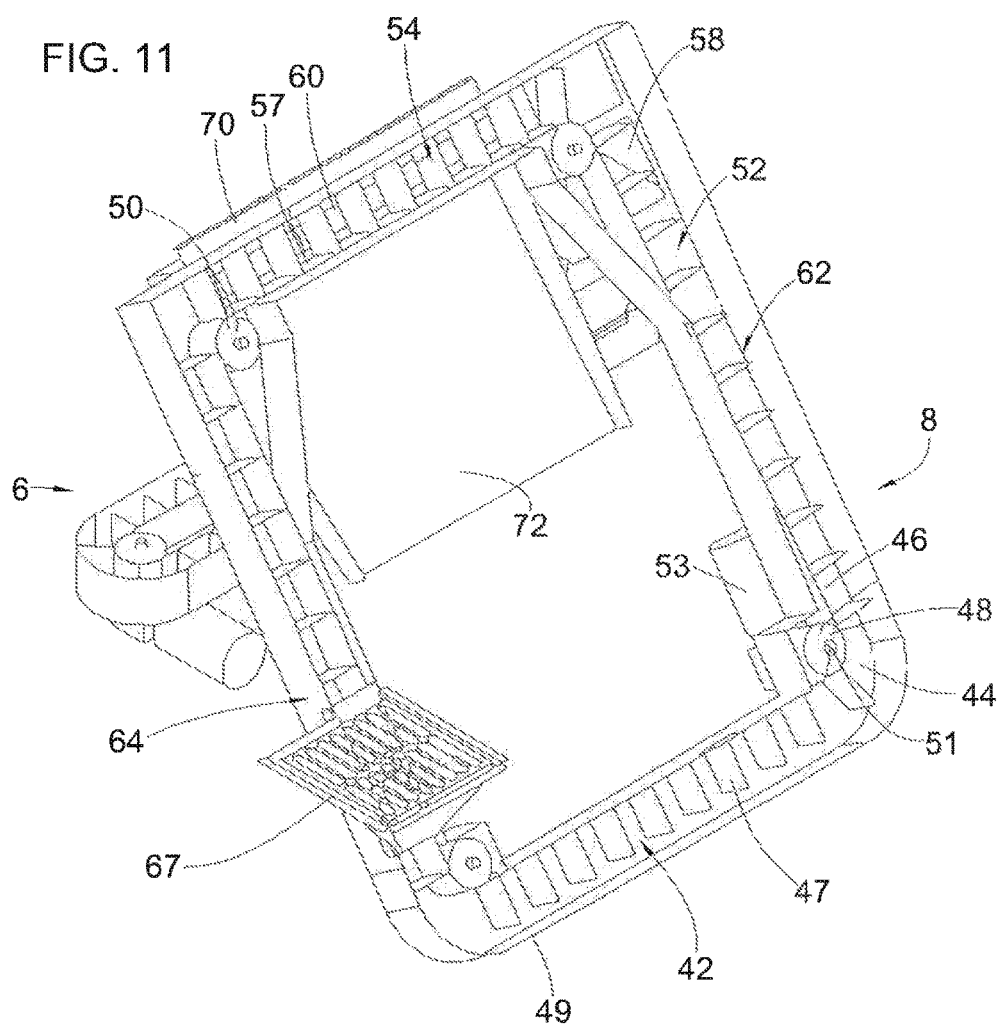

US 9,635,880 B2

REDUCED-SIZE APPARATUS FOR APPLYING FOOD COATING AND METHODS OF USE THEREOF

CROSS-REFERENCE TO RELATED APPLICATIONS

This application claims the benefit of U.S. provisional patent application No. 61/255,223 entitled "REDUCED-SIZE APPARATUS FOR APPLYING FOOD COATING AND METHODS OF USE THEREOF" and filed on Oct. 27, 2009, which is hereby incorporated by reference herein.

FIELD OF THE INVENTION

The field of invention includes food coating, food topping, and food conveying equipment.

BACKGROUND OF THE INVENTION

Prepared food products come in a wide variety of styles. Many prepared food products, whether ready-to-eat or those needing further cooking, are prepared with a coating that makes the food product more appealing. Such prepared food products include entrees, appetizers, desserts (such as pastries, donuts), etc., and include meats, cheese, fruit and vegetables, etc. The types of coatings used on these food products can include dry coatings such as flour, bread crumbs, corn meal, sugar and spice, and the like.

Prepared food products can also include one or more toppings applied to one or more sides of the food product. Such prepared food products include pizzas, pretzels, fish or other meat patties, and the like. The types of toppings used on these food products include cheese, mushrooms, sausage, sugar and cinnamon, spices, breadings, salt, and the like.

Some food products have a batter applied to them before the coating or topping is applied. In the commercial production of prepared foods, a large variety of food products are machine-coated with breading, flour or the like before being fried (or otherwise cooked), or simply frozen and packaged. Food coatings may also include seasonings, spices, shortening, etc., as needed to add flavor and texture to the food product. Other coatings such as ground cereal, dried vegetables or the like may also be employed.

BRIEF DESCRIPTION OF THE DRAWINGS

Embodiments of the apparatus and method are disclosed with reference to the accompanying drawings and are for illustrative purposes only. The apparatus and method are not limited in their application to the details of construction or the arrangement of the components illustrated in the drawings. The apparatus and method is capable of other embodiments or of being practiced or carried out in other various ways. The drawings illustrate a best mode presently contemplated for carrying out the apparatus and method. In the drawings:

FIG. 11 is a perspective view of the feed assembly and recycle assembly of FIG. 5.

SUMMARY OF THE INVENTION

Figure 1:
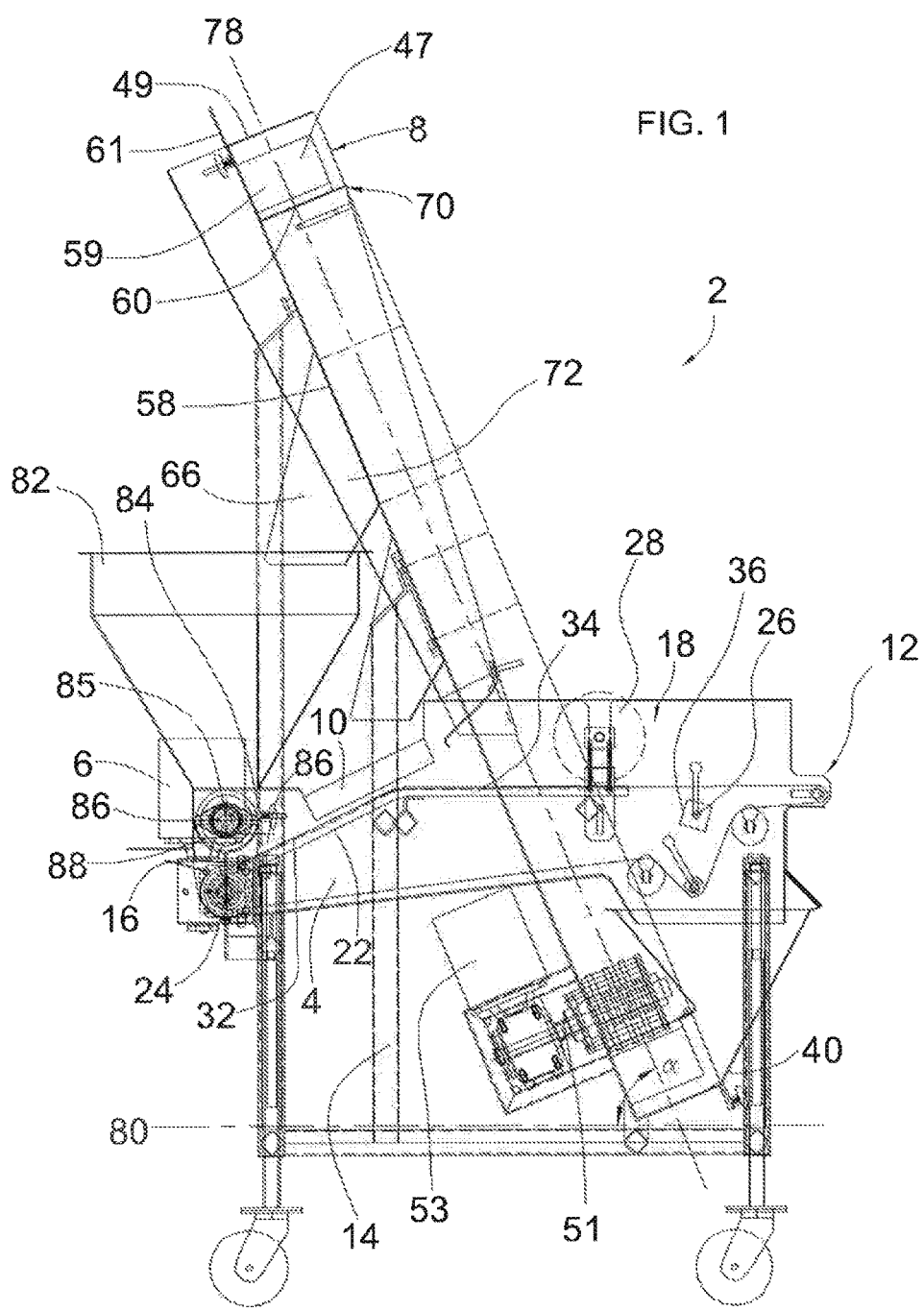
FIG. 1 is a side view of an exemplary embodiment of a reduced-size apparatus for applying coating to food products including, a belt assembly, a feed assembly, and a recycle assembly.

The present inventors have recognized that in particular circumstances a processing facility cannot accommodate a traditionally sized apparatus for applying food coating. Therefore, it would be desirable to provide a reduced-size apparatus for applying food coating.

In at least some embodiments, the apparatus relates to a reduced-size apparatus for applying food coating that includes a belt assembly for conveying food products, having an input end and an output end, and a recycle assembly, capable of receiving excess coating from the output end of the belt assembly and conveying it to the input end. Additionally, in another embodiment, the recycle assembly includes a base coating distribution passage and a top coating distribution passage for providing coating for application to a food product situated on the belt assembly. Further, in yet another embodiment, the apparatus includes a longitudinal recycle assembly center plane situated between about 55 degrees to about 85 degrees with respect to a horizontal plane.

Additionally, in another embodiment, the apparatus relates to a reduced-size apparatus for applying food coating that includes a belt assembly for conveying food products, having an input end and an output end, and a recycle assembly, capable of receiving a food product coating not adhered to the food products from adjacent the output end of the belt assembly and conveying it for dispersal to the food products at the input end, wherein a center plane through the recycle assembly is situated between about 55 degrees to about 85 degrees with respect to a horizontal plane.

Further, in yet another embodiment, the method relates to a method of applying food coating that includes conveying food products along a belt assembly having an input end and an output end, coating at least one of a bottom portion of the food products with coating provided to the belt assembly by a base coating distribution passage and a top portion of the food products with coating provided by a top coating distribution passage, wherein the base coating distribution passage and the top coating distribution passage are situated at the input end. The method further including transporting coating that is not adhered to the food product from adjacent the output end of the belt assembly for dispersal at the input end of the belt assembly, via an augerless recycle assembly having a channel, wherein a longitudinal recycle assembly center plane is situated between about 55 degrees to about 85 degrees with respect to a horizontal plane.

In addition, in still yet another embodiment, the method relates to a method of applying food coating that includes conveying food products along a belt assembly having an input end and an output end and coating a bottom portion of the food products with coating provided to the input end of the belt assembly by a first drag belt conveyor that includes a base coating distribution port for dispensing coating onto the belt assembly. The method further including coating a top portion of the food products with coating provided to the input end of the belt assembly by a second drag belt conveyor that includes a top coating distribution passage for dispensing coating onto the food product situated on the belt assembly, and conveying the coating that is not adhered to the food products, from adjacent the output end of the belt assembly to adjacent the input end of the belt assembly, via the second conveyor, wherein the second conveyor includes a base coating distribution passage for supplying the first conveyor with coating.

DETAILED DESCRIPTION OF THE PREFERRED EMBODIMENT

FIG. 1 depicts a first exemplary embodiment of an apparatus 2 for applying coating to food products. The apparatus 2 includes a belt assembly 4, a feed assembly 6, and a recycle assembly 8. In at least some embodiments, the frame 14 supports one or more of the belt assembly 4, the feed assembly 6, and the recycle assembly 8. In addition, one or more of the assemblies 4, 6, 8 can be supported by another of the assemblies 4, 6, 8. The belt assembly 4 is configured to receive and convey food products from an apparatus input end 10 as coating is applied to the food product bottom and/or top surfaces by at least one of the feed assembly 6 and the recycle assembly 8. After the food products have been coated, they are deposited off the belt assembly 4 and the recycle assembly 8 recovers any excess coating (coating not adhered to the food product) at the apparatus output end 12. In an exemplary embodiment and as discussed below, the apparatus 2 is intended to apply one of numerous types of coatings, for example, flour, bread crumbs (American, Japanese, Panko, etc.), spices, seasonings, glazing/sugars, cheese, mushrooms, sausage, and salt, to food products such as chicken, turkey, pork, beef, fish, vegetables, fruits, pizzas, pretzels, and bakery items. As discussed herein, the term coating is intended to encompass both coatings and toppings.

Figure 2:
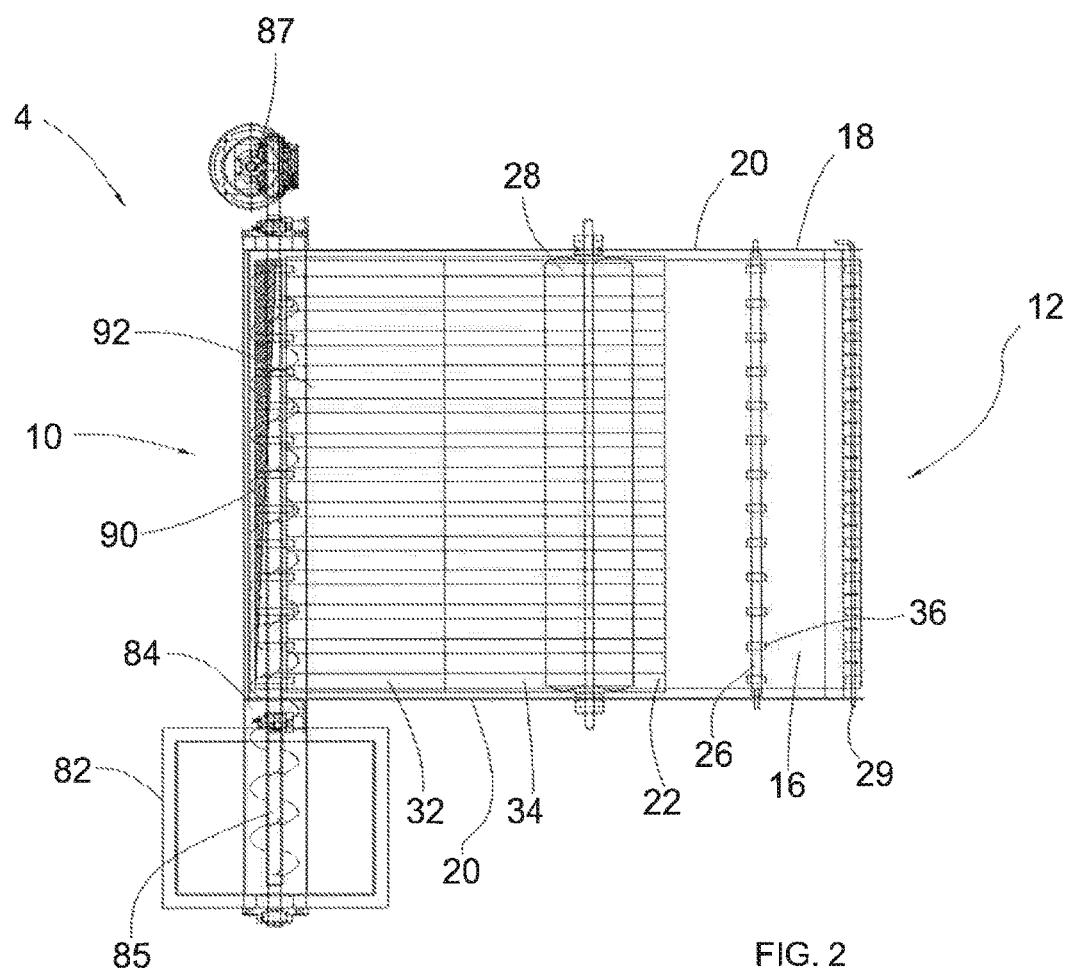
FIG. 2 is a top view of the belt assembly and the feed assembly of FIG. 1.

FIG. 2 depicts a top view of the belt assembly 4 of the apparatus 2, which includes a belt frame 18, of which a wire belt 16 revolves about. The wire belt 16 is known in the art as having a series of gaps between supporting portions wherein a product is supported on the belt surface while allowing smaller particles to pass through the belt. The belt frame 18 includes sides 20 with a support bottom 22 situated therebetween. The wire belt 16 is rotated with a drive mechanism (not shown), such as a drive shaft and a motor. The wire belt 16 used in the apparatus 2 can be of different sizes depending upon, among other things, the size of the coating particles and the size of the food products conveyed on the wire belt 16. The wire belt 16 can have various widths, although in at least one embodiment, the belt is about 36 inches wide.

The belt assembly 4 further includes a plurality of rollers, more specifically, and in one embodiment, the belt assembly 4 includes an input end roller 24 (FIG. 1), an agitation roller 26, a pat down roller 28 and an output end roller 29, although in other embodiments more or less rollers can be used. In addition, the support bottom 22 includes a ramp portion 32 and a horizontal portion 34, wherein the support bottom 22 guides the wire belt 16 along a desired path and also serves to temporarily retain and position coating for the underside of the food products. The pat down roller 28 is secured to the belt frame 18 above the support bottom 22, wherein food product moving along the wire belt 16 actuates the pat down roller 28 to provide for rotary actuation thereof. The pat down roller 28 exerts a compressive force on the food product and coating thereby pressing the coating onto the food product to aid coating retention.

In at least one embodiment, the support bottom 22 extends from the input end 10 towards the output end 12, with at least a portion of the support bottom 22 not extending completely to the output end 12, therefore providing a distance along the support bottom 22 where the coating that is not adhered to the food product and that is being dragged by the wire belt 16 is not supported. As the support bottom 22 ends, the coating situated on the wire belt 16 descends through the wire belt while the food product continues moving towards the output end 12. Additionally, coating that is dragged underneath the wire belt 16 drops off the support bottom 22 as well.

The agitation roller 26 is supported by the belt frame 18 and extends at least partially across the width of the belt frame 18 and is positioned after the support bottom 22 substantially terminates and before the output end roller 29. The agitation roller 26 includes a plurality of offset cams 36 that serve to push upwards on the wire belt 16 as it passes thereover, thereby lifting the wire belt 16 at various points resulting in an uneven surface that agitates the coating and food product situated on the wire belt 16. This agitation of the wire belt 16 serves to displace excess coating that would otherwise rest atop the food product or be loosely adhered to the wire belt and food product.

Excess coating that descends from under or through the wire belt 16 is directed along a discharge chute 40 (FIG. 1). The discharge chute 40 base can include one or more sheets of material, such as stainless steel, which is bent or fastened to at least partially enclose the bottom of the belt assembly 4 and to convey coating that is situated under the belt assembly 4 and coating that descends from the wire belt 16. The coating received in the discharge chute 40 is funneled to a lower length 42 of the recycle assembly 8 (FIG. 3).

Figure 3:
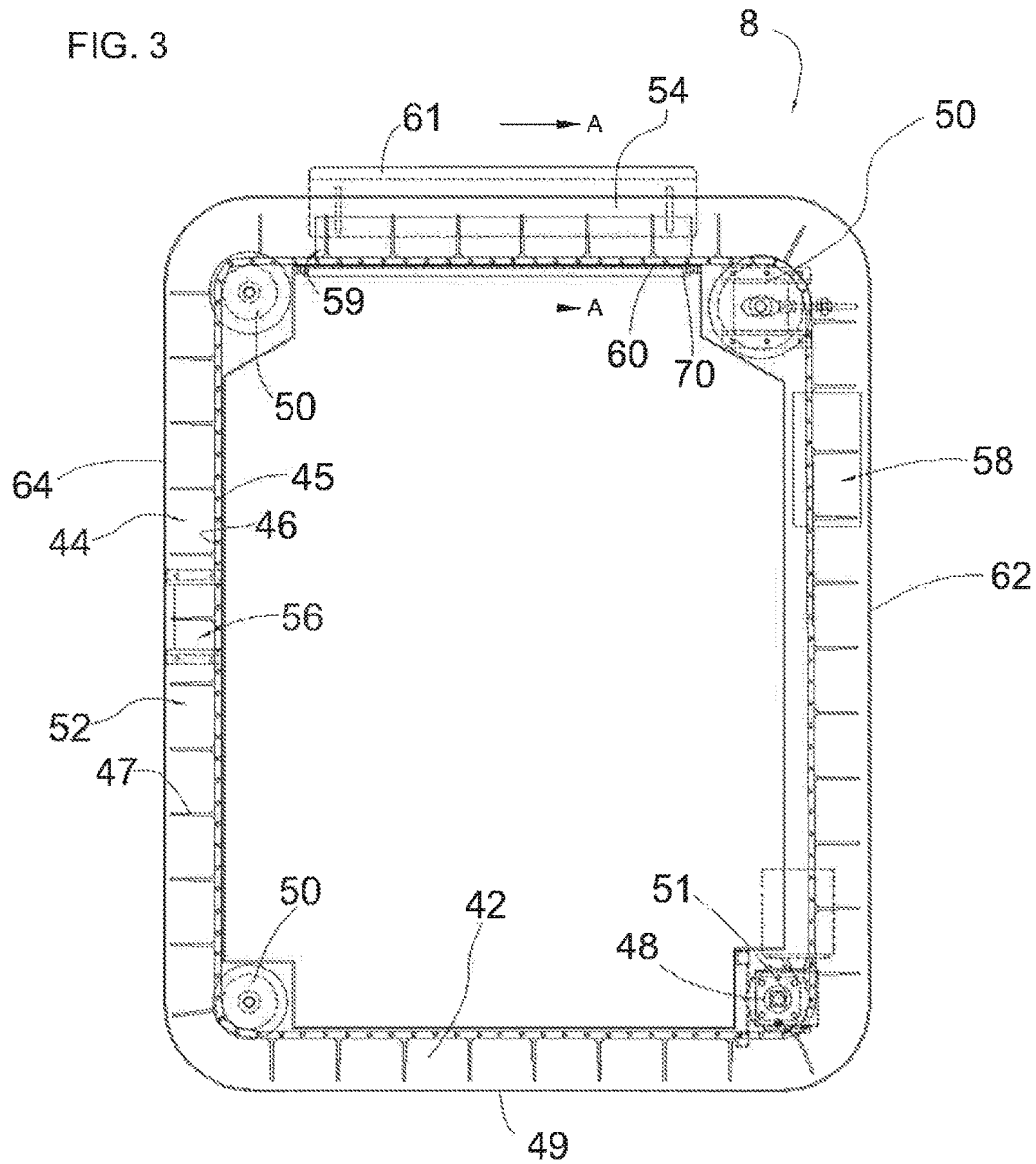
FIG. 3 is a top view of the recycle assembly of FIG. 1.

FIG. 3 depicts a top view of the exemplary recycle assembly 8 used to recycle the coating discharged by the belt assembly 4, wherein the recycle assembly 8 serves, at least in part, as a conveyor of coating. In one embodiment, the recycle assembly 8 is in a substantially rectangular configuration with four corners, where one of the corners includes a drive rotor 48 that engages the cogs of a coating (drag) belt 46 situated in a channel 44, and the other three corners have idle rollers 50 for guiding the abutted coating belt 46, to form a rectangular shape that conforms to the channel 44. The channel 44 includes an upper length 54, a lower length 42, an ascending portion 64, and a descending portion 62.

The drive rotor 48 is received on a drive shaft 51 and driven by a conveyor motor 53 (see FIG. 1) such as a hydraulic or electric motor. Additionally, the use of a substantially rectangular shaped recycle assembly 8 permits the coating (drag) belt 46 to be wrapped around the apparatus 2, thereby allowing a reduction in the overall footprint of the apparatus 2. Although the recycle assembly 8 is shown and described as rectangular, other configurations can be used as well, for example, oblong, circular or square.

The coating (drag) belt 46 includes a plurality of flights 47. In one embodiment, the flights 47 are hingedly connected to the belt wherein the hinges include one or more passages to allow the coating to flow therethrough, particularly when the hinges are positioned about the top coating distribution passage 60. In other embodiments, the passages can be located in positions other than the hinges. An exemplary belt that can be used on the apparatus 2 is a Uni-belt/chain Part No. 24PPPP4V36W, as manufactured by Ammeraal Beltech Modular, Inc. of Reading, Pa., having flights that are 4 inches high by 6 inches wide and spaced 6 inches apart.

Further referring to FIG. 3, the flights 47 in the coating (drag) belt 46 define moving compartments 52 in the channel 44, for transporting coating. The flights 47 can vary in size to accommodate the transport of more or less coating. Further, the flights 47 can be oriented at various angles with respect to channel 44, although in one embodiment the flights 47 are oriented perpendicular to an outer wall surface 49 of the channel 44.

In addition, the channel 44 includes various passages for distributing the coating situated in the compartments 52. In at least one embodiment, the channel 44 includes a drain passage 56, a base coating distribution passage 58, and at least one top coating distribution passage 60. The drain passage 56 is located along an ascending portion 64 of the recycle assembly 8 and can be accessed to allow the coating in the channel 44 to drain through the drain passage 56 as the belt 46 rotates. The draining of the coating allows for efficient cleaning of the recycle assembly 8 post-process.

The base coating distribution passage 58 is situated on the descending portion 62 of the recycle assembly 8 and can include a metering gate (not shown), such as an adjustable slide cover secured to the bottom of the base coating distribution passage 58 to meter the flow of coating through the base coating distribution passage 58. In addition, a base chute 66 (FIG. 1) is situated below the base coating distribution passage 58 to funnel coating to the feed assembly 6. The base chute 66 can include one or more sheets of material, such as stainless steel, bent or fastened to at least partially enclose and convey coating.

The top coating distribution passage 60 can also include a metering gate 70, such as an adjustable slide cover, secured to the bottom of the top coating distribution passage 60. In addition, a top chute 72 (FIG. 1) is situated below the top coating distribution passage 60 to funnel coating towards the wire belt 16, more particularly, to the top of the food product situated on the wire belt 16. The top chute 72 can include one or more sheets of material, such as stainless steel, bent or fastened to at least partially enclose and convey coating. Although the passages have been shown in specific locations about the channel 44, in some embodiments, they can be located in various other positions.

Figure 4:
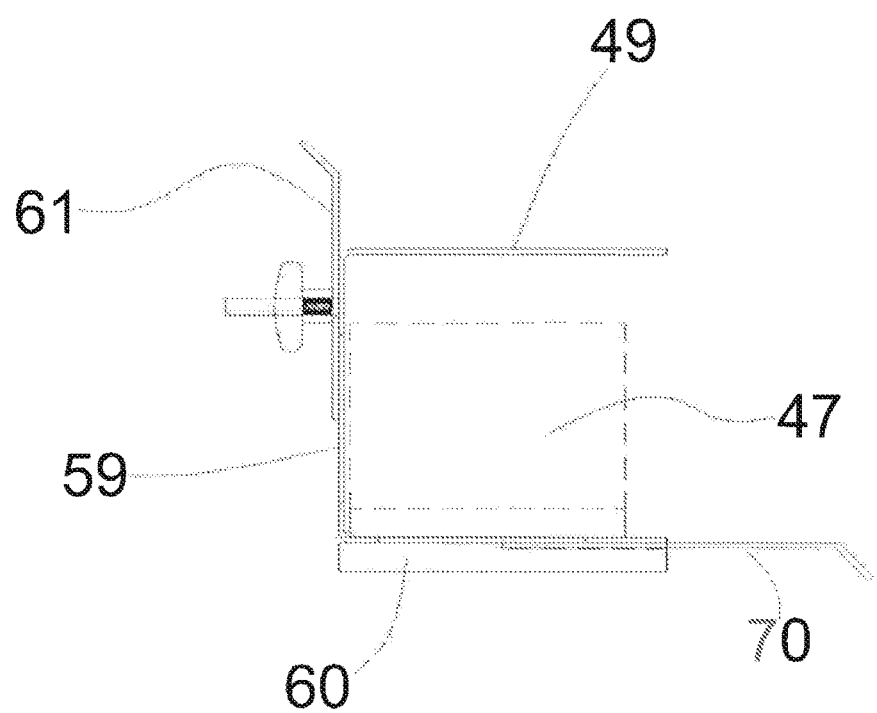
FIG. 4 is a section view at A-A of FIG. 3.
Figure 5:
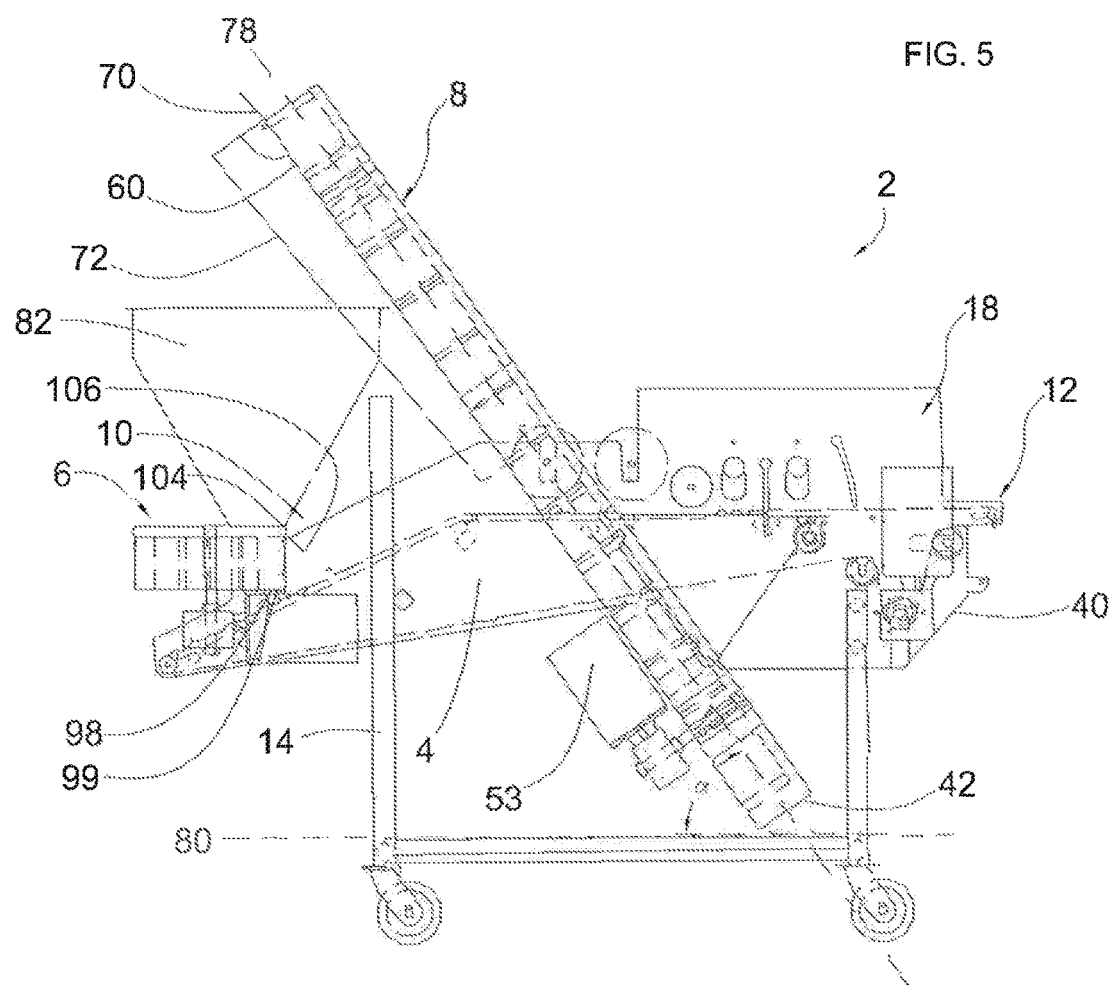
FIG. 5 is a side view of another exemplary embodiment of the reduced-size apparatus for applying coating to food products including, a belt assembly, a feed assembly, and a recycle assembly.
Figure 6:
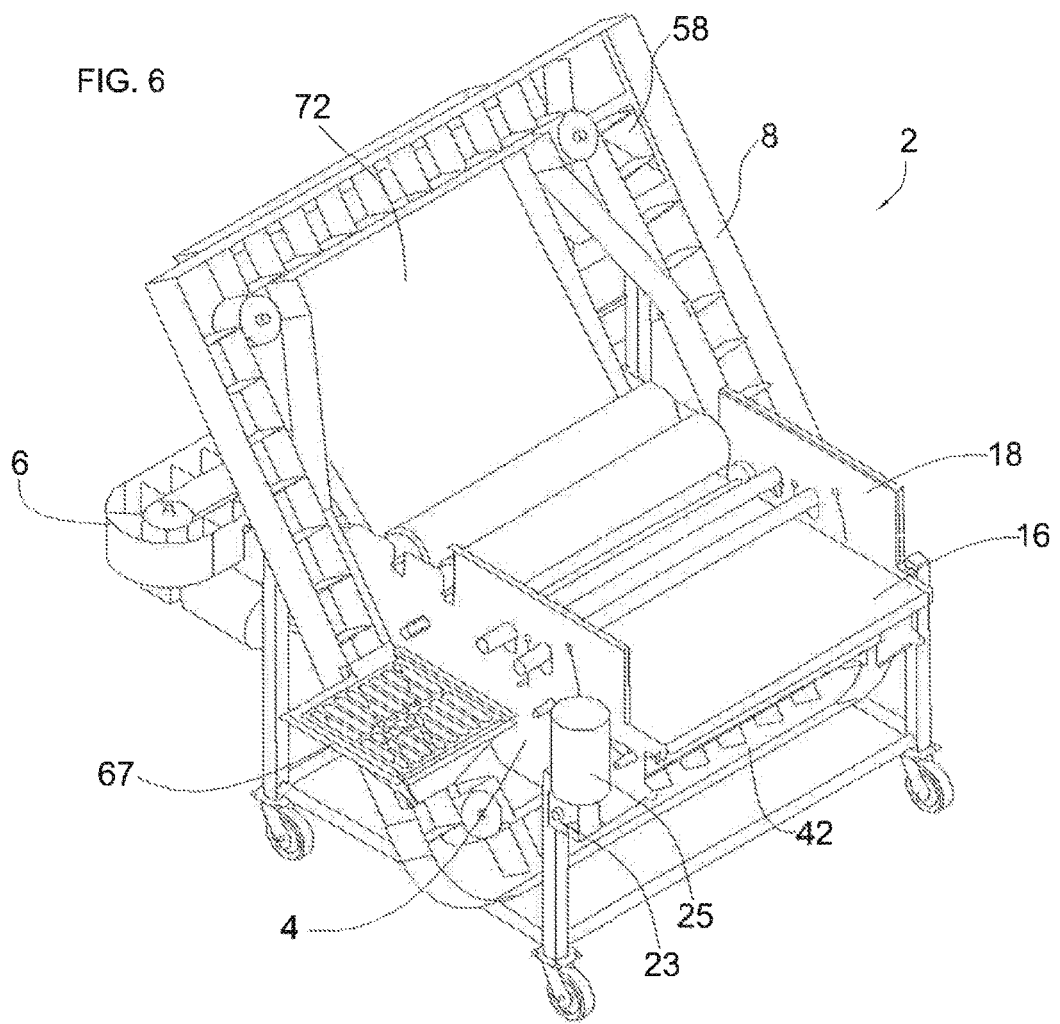
FIG. 6 is a front perspective view of the apparatus of FIG. 5.
Figure 7:
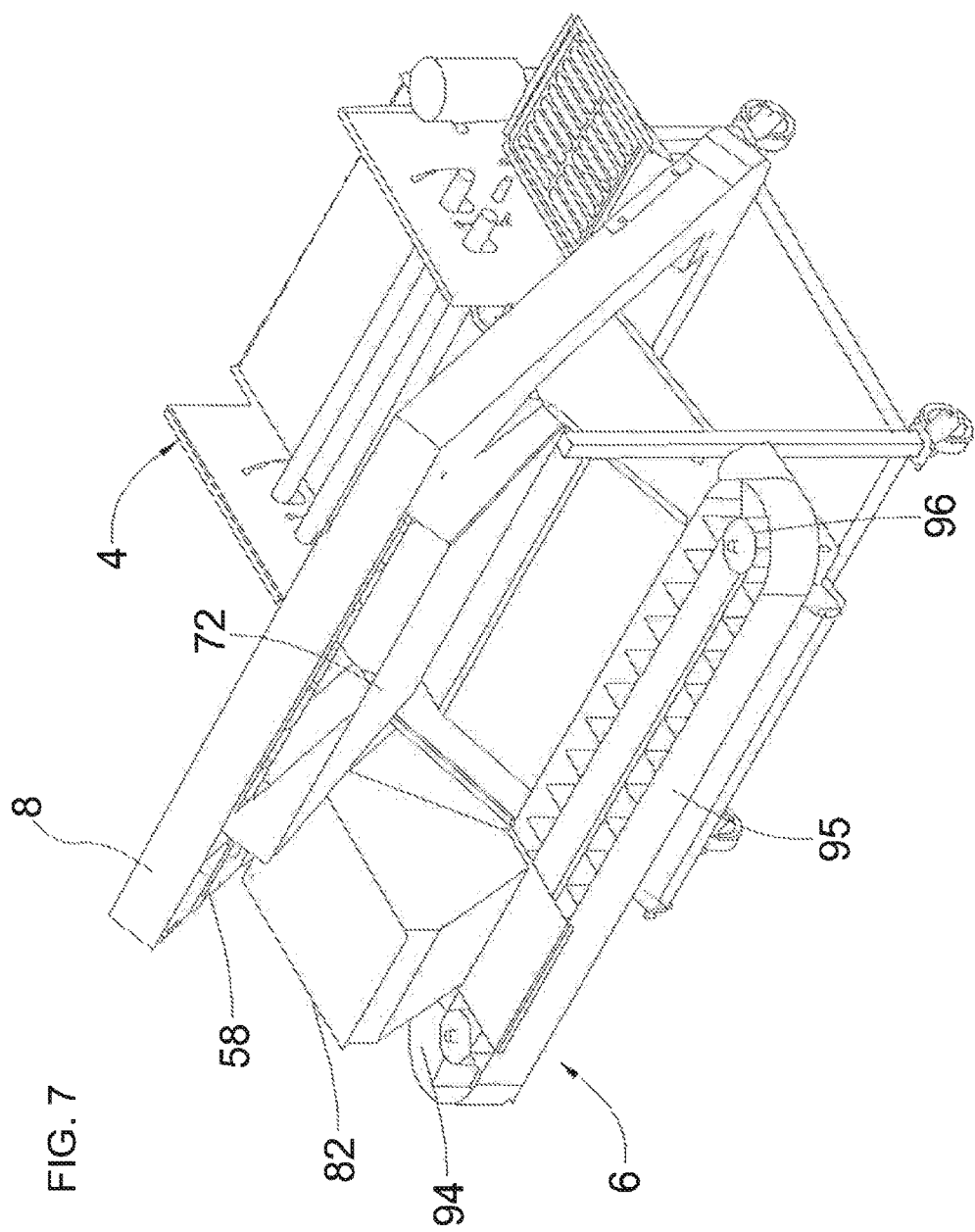
FIG. 7 is a back perspective view of the apparatus of FIG. 5.
Figure 8:
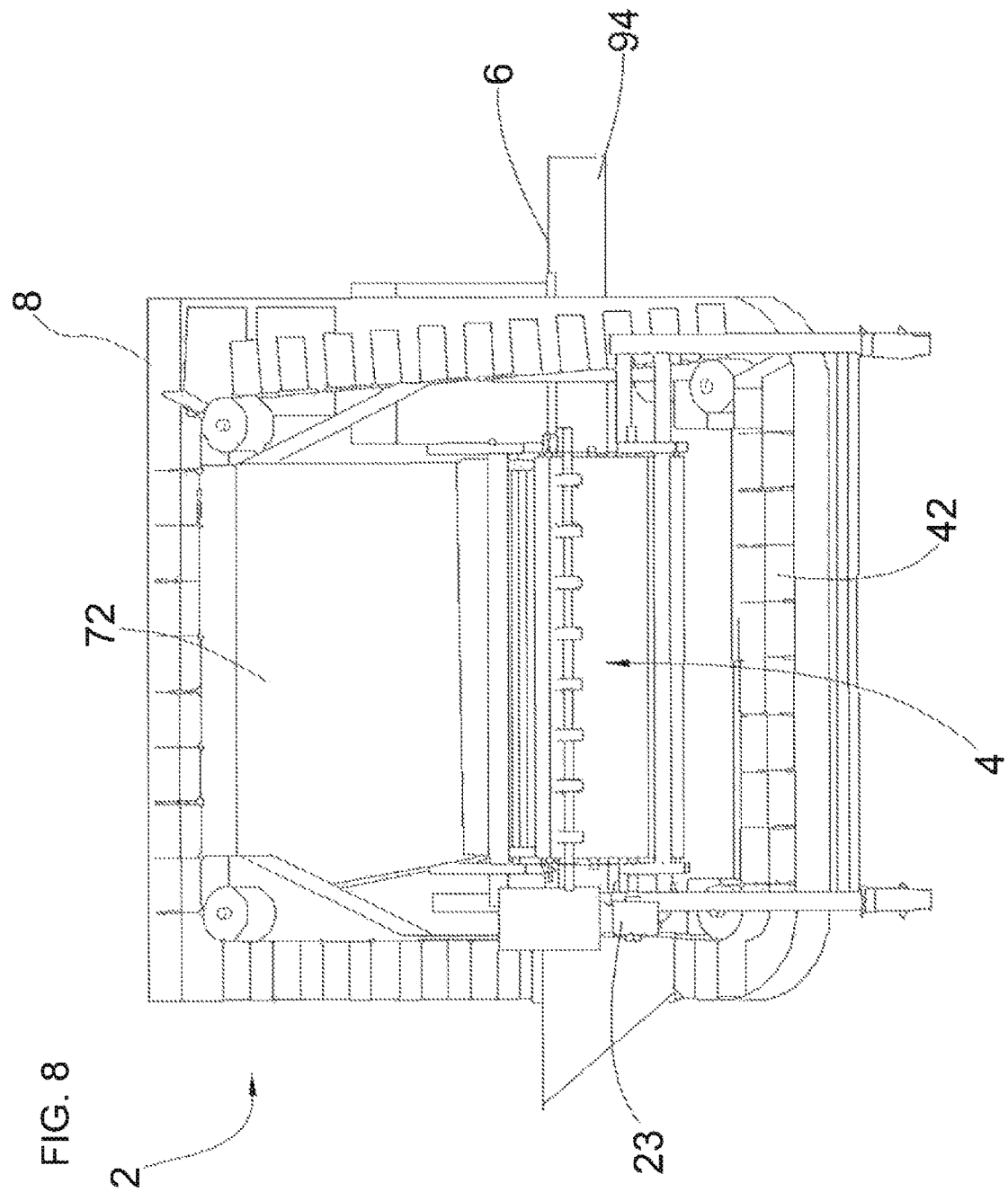
FIG. 8 is a front view of the apparatus of FIG. 5.

Still referring to FIG. 3, the top coating distribution passage 60 can further include a biasing portion (not shown), such as an angled plate, that extends at least partially along the length of the top coating distribution passage 60 to provide a graduated top passage opening 57 along the top coating distribution passage 60. The biasing portion decreases in width along the length of the top coating distribution passage 60 in the direction of rotation of the drag belt 46, such that the top passage opening 57 increases in size in the direction of rotation, thereby providing a substantially even flow and distribution of coating from the top coating distribution passage 60 down the top chute 72 and onto the food products. Referring to FIG. 4, in at least some embodiments, an additional top coating distribution passage 59 is included for providing an alternate or additional flow of coating from the upper length 54 of the channel 44. The additional passage 59 can also include a metering gate 61 to control the flow of coating therethrough.

As seen in FIG. 1, the recycle assembly 8 includes a longitudinal recycle assembly center plane 78 that extends along the channel 44, wherein the center plane 78 is situated at an angle $\alpha$ with respect to a horizontal plane 80. In at least one embodiment, angle $\alpha$ is about 68 degrees, although in other embodiments the angle $\alpha$ can range from about 55 degrees to about 85 degrees, while in some other embodiments the angle $\alpha$ can range from about 35 degrees to about 85 degrees. The recycle assembly 8 is situated in the aforementioned angle $\alpha$ range to provide a short profile apparatus, as increasing angle $\alpha$ results in reducing the overall length of the apparatus 2 and thereby requires a smaller space to be accommodated. The length of the apparatus is considered to be the distance between the extents of the apparatus, the extents being referenced to the horizontal plane 80 extending in a direction between the input side 10 and the output side 12.

Referring again to FIG. 1, the feed assembly 6 is depicted in a side view in FIG. 1 and in part, in a top view in FIG. 2. The feed assembly 6 is situated at the input side 10 of the belt assembly 4 and receives coating from the recycle assembly 8 via the base chute 66. The feed assembly 6 includes a base hopper 82 that serves to funnel the coating received from the base chute 66 into a base channel 84, wherein a cross-conveyor, such as an auger 85, moves the coating along the length of the base channel 84. The auger 85 can be driven with a hydraulic motor 87, such as a Charlynn or the like, or an electric motor. The base channel 84 includes sides 86 and a bottom portion 88, with the bottom portion 88 including a biasing portion 90 and an opening 92. The biasing portion 90 extends at least partially along the length of the bottom portion 88, wherein the biasing portion 90 decreases in width as the base channel 84 extends away from the base hopper 82, such that the opening 92 increases in size. As the coating is moved along the base channel 84 by the auger 85, it is dispersed through the opening 92 and onto the wire belt 16. As the coating is dispersed, it decreases in quantity along the length of the auger 85, and as a result of the biasing portion 90 creating a progressively widening opening 92, a substantially even flow of coating is dispersed from the bottom portion 88 along the substantial width of the wire belt 16. The substantially even flow of coating along the length of the opening 92 provides a substantially uniform layer of coating for the food product to be received upon the wire belt 16.

In an exemplary operation, the recycle assembly 8 is charged by placing coating in the channel 44. Upon activation of the coating (drag) belt 46, the coating is transported by the compartments 52 to the base coating distribution passage 58 and the top coating distribution passage 60. The coating can then be provided to the food products for at least one of a base coat and a top coat. To provide a base coat, the base coating distribution passage 58 is opened thereby allowing the coating to be dispersed through the base coating distribution passage 58 and funneled downwards through the base chute 66 and base hopper 82 where the auger 85 transports and disperses the coating along the width of the wire belt 16 above the ramp portion 32 of the support bottom 22. The coating is transported on the wire belt 16 from the input end 10 towards the output end 12.

After the wire belt 16 has been provided with coating, food products are deposited onto the wire belt 16, typically above the ramp portion 32. The food products and coating travel on the wire belt 16 along the ramp portion 32 and proceed along the horizontal portion 34 of the support bottom 22, where they pass underneath the top chute 72. When coating is desired on the top portion of the food products, coating from the compartments 52 is dispersed through the top coating distribution passage 60 and descends along the top chute 72 and onto the food products, thereby providing the top coating. The food products continue on the wire belt 16 along the horizontal portion 34, where they pass under the pat down roller 28, which applies pressure to the food product and coating, thereby pressing the coating into the food product surface.

After passing under the pat down roller 28, the support bottom 22 terminates as discussed above, although the wire belt 16 continues towards the output end 12. With the support bottom 22 no longer situated under the wire belt 16, the coating that is not adhered to the food products descends through the wire belt 16 and into the discharge chute 40. In addition, coating that was carried along under the wire belt 16 on the top surface of the support bottom 22 falls into the discharge chute 40. Further, to aid in the removal of excess coating from the food products and the wire belt 16, the wire belt 16 is lifted and dropped by the agitation roller 26, thereby shaking loose excess coating and allowing it to fall off the food product and through the wire belt 16.

As discussed above, the excess coating is received by the discharge chute 40, where the discharge chute 40 funnels the coating into the lower length 42 of the recycle assembly 8 for subsequent transport to the input end 10 of the apparatus 2. The use of the discharge chute 40, base chute 66, top chute 72 and recycle assembly 8 substantially reduces the pulverization of the coating that can occur with traditional methods, such as dragging the coating against a rigid member under a drag belt from an outlet end to an inlet end, or transporting the coating through a multitude of auger-type conveyors.

In addition to the aforementioned recycle assembly 8, it has been contemplated that a wheel conveyor assembly (not shown) can be utilized in place of the recycle assembly 8. The wheel conveyor assembly includes a plurality of compartments/buckets situated about a rotational frame, wherein in at least one embodiment, the frame is situated around the belt assembly 4. The compartments can receive the excess coating from a discharge point, such as discharge chute 40, while positioned at a lower point. As the frame is rotated, the compartments are raised to a higher point where the coating can be ejected or otherwise fall from the compartments into one or more trays and/or chutes with or without a metering system, and directed to at least one of the wire belt 16 or the top of food products.

FIGS. 5-11 depict another exemplary embodiment of the apparatus 2. In particular, FIGS. 5, 6, 7, and 8 depict the apparatus 2, which includes the belt assembly 4, the feed assembly 6, and the recycle assembly 8. Although the feed assembly in this embodiment serves a similar purpose to the above described embodiment, this embodiment utilizes a drag belt conveyor in contrast to the auger style conveyor. In at least some embodiments, the frame 14 supports one or more of the belt assembly 4, the feed assembly 6, and the recycle assembly 8. In addition, one or more of the assemblies 4, 6, 8 can be supported by another of the assemblies 4, 6, 8. As described above, the belt assembly 4 is configured to receive and convey food products from the apparatus input end 10 as coating is applied to the food product bottom and/or top surfaces by at least one of the feed assembly 6 and the recycle assembly 8. After the food products have been coated, they are deposited off the belt assembly 4 and the recycle assembly 8 recovers any excess coating at the apparatus output end 12.

Figure 9:
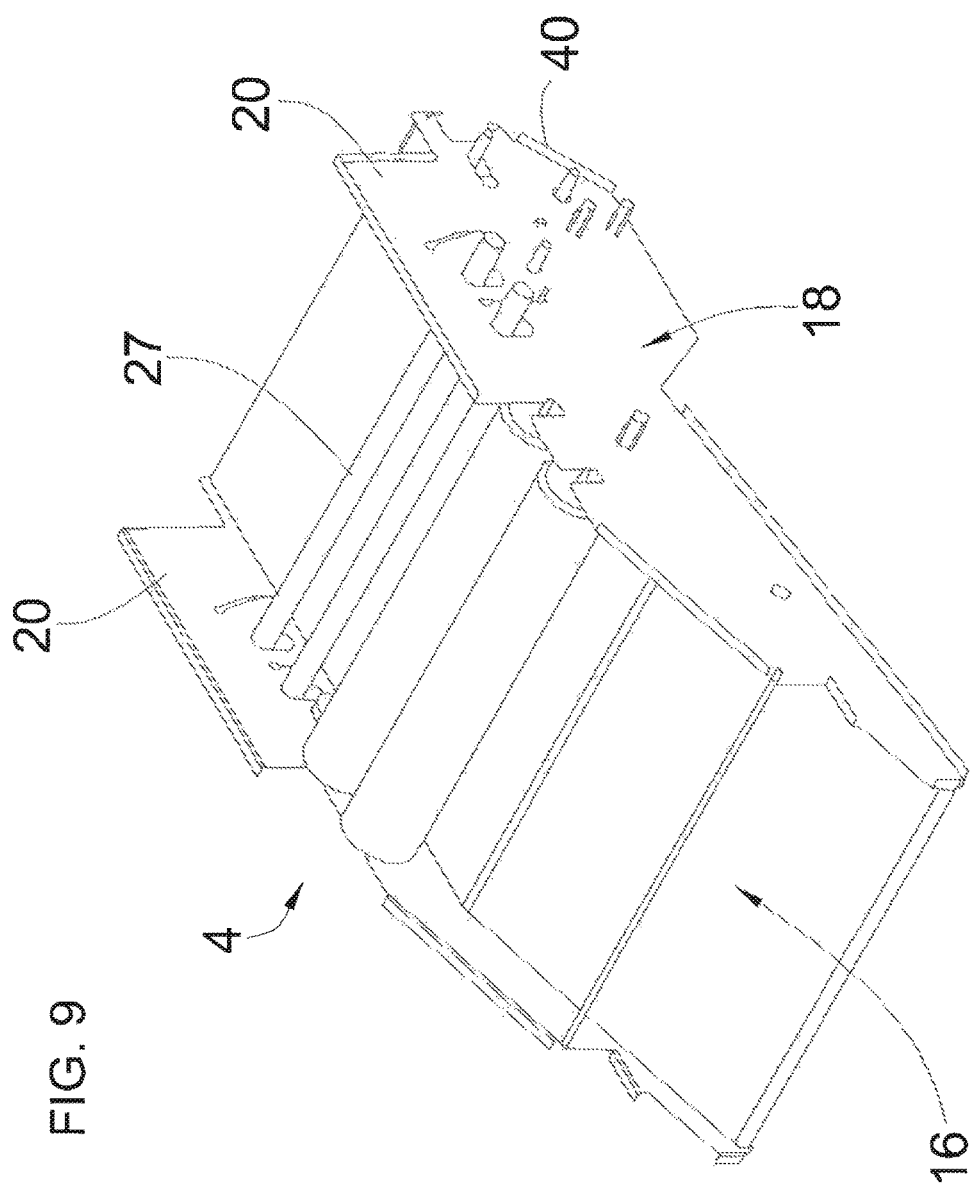
FIG. 9 is a perspective view of the belt assembly of FIG. 5.
Figure 10:
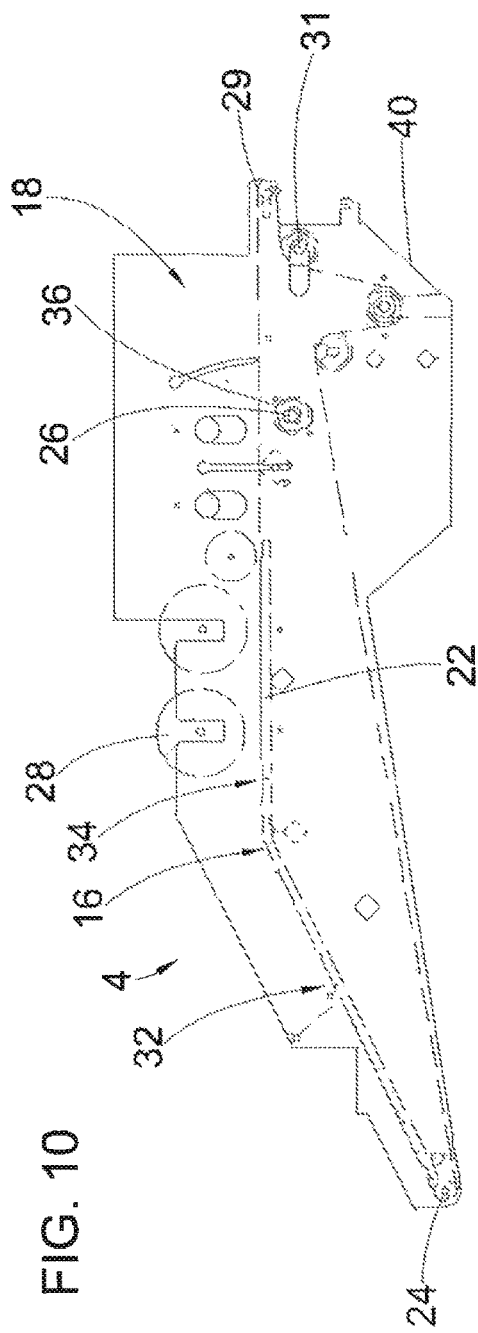
FIG. 10 is a side view of the apparatus of FIG. 5.

FIGS. 9 and 10 depict the belt assembly 4, which includes the belt frame 18, of which the wire belt 16 revolves about. The belt frame 18 includes the sides 20 with the support bottom 22 situated therebetween and connecting the sides 20. The wire belt 16 is rotated with a drive mechanism 23 using a motor 25. The wire belt 16 used in the apparatus 2 can be of different sizes depending upon, among other things, the size of the food products conveyed on the wire belt 16 and the size of the coating particles. The wire belt 16 can have various widths, although in at least one embodiment, the belt is about 36 inches wide. It should be noted that the wire belt 16 in FIGS. 6-9 is shown as a solid belt, although in practice, the wire belt 16 includes a series of gaps to allow coating to pass therethrough, such as the wire belt 16 described above and as seen in FIG. 2.

The belt assembly 4 further includes a plurality of rollers, more specifically, and in one embodiment, the belt assembly 4 includes, the input end roller 24, the agitation roller 26, the pat down rollers 28 and the output end roller 29, although in other embodiments more or less rollers can be used. Further, one or more return guide rollers 31 can be provided to guide the belt 16 between the output end roller 29 and the input end roller 24. In addition, the support bottom 22 includes the ramp portion 32 and the horizontal portion 34, wherein the support bottom 22 guides the wire belt 16 along a desired path and also serves to temporarily retain and position coating for the underside of the food products. The pat down rollers 28 are secured to the belt frame 18 above the support bottom 22, wherein food product moving along the wire belt 16 actuates the pat down rollers 28 to provide for rotary actuation thereof. The pat down rollers 28 exert a compressive force on the food product and coating thereby pressing the coating onto the food product to aid coating retention.

In at least one embodiment, the support bottom 22 extends from the input end 10 towards the output end 12, with at least a portion of the support bottom 22 not extending completely to the output end 12, therefore providing a distance along the support bottom 22 where the coating that is not adhered to the food product and that is being dragged by the wire belt 16 is not supported. As the support bottom 22 ends, the coating situated on the wire belt 16 descends through the wire belt while the food product continues moving towards the output end 12. Additionally, coating that is dragged underneath the wire belt 16 drops off the support bottom 22 as well.

The agitation roller 26 is supported by the belt frame 18 and is positioned at least partially across the width of the belt frame 18, and between the support bottom 22 and the output end roller 29. The agitation roller 26 includes a plurality of offset cams 36 that serve to push upwards on the wire belt 16 as it passes there over, thereby lifting the wire belt 16 at various points resulting in an uneven surface that agitates the coating and food product situated on the wire belt 16. This agitation of the wire belt 16 serves to displace excess coating that would otherwise rest atop the food product or be loosely adhered to the wire belt and food product. In addition, one or more blow off tubes 27 can be provided to further encourage the dispersion of excess coating from the product and to push the coating through the wire belt 16.

Excess coating that descends from under or through the wire belt 16 after the support bottom 22 terminates is directed along a discharge chute 40. The discharge chute 40 (see FIG. 10) is situated at least partially under the belt assembly 4 and can be formed from one or more sheets of material, such as stainless steel, bent or fastened to at least partially enclose the bottom of the belt assembly 4 and to provide a conveyance for coating that descends from the wire belt 16 and the support bottom 22. The coating received in the discharge chute 40 is funneled to the recycle assembly 8 about the lower length 42.

FIG. 11 depicts a perspective view of the feed assembly 6 and the recycle assembly 8, which both serve to recycle coating discharged by the belt assembly 4 and position it for application to the product, wherein the feed assembly 6 serves, at least in part, as a conveyor. In one embodiment, the recycle assembly 8 is in a substantially rectangular configuration with four corners, where one of the corners includes the drive rotor 48 that engages the cogs of the coating (drag) belt 46 situated in the channel 44, and the other three corners have idle rollers 50 for guiding the abutted coating belt 46 to conform to the shape of the channel 44. The channel 44 includes the upper length 54, the lower length 42, the descending portion 62, and the ascending portion 64. Additionally, the use of the substantially rectangular shaped recycle assembly 8 permits the coating belt 46 to be wrapped around the apparatus 2, thereby allowing a reduction in the overall footprint of the apparatus 2. Although the overall shape of the recycle assembly 8 is shown and described as rectangular, other configurations can be used as well, for example, oblong, circular or square.

The drive rotor 48 is received on the drive shaft 51, which is driven by the conveyor motor 53, such as a hydraulic or electric motor. The conveyor motor 53 is controlled by a motor controller assembly (not shown) that includes a conveyor motor amperage draw sensor (not shown) for monitoring the amperage draw on the conveyer motor 53. The amperage draw of the conveyor motor 53 provides an indication of the level of coating that is being conveyed by the coating (drag) belt 46 inside the channel 44. In particular, as the level of coating decreases, the amperage draw will decrease, as less power is needed to operate the coating belt due to a reduced weight of the coating being conveyed. By sensing the drop in amperage draw from a desired optimal level of amperage draw (optimal level indicating the channel 44 is filled to the desired capacity), a coating supply feeder (not shown) can be activated to transfer additional coating into the recycle assembly 8 via a supply hopper 67 that is positioned above the channel 44. In at least some embodiments, a decrease in amperage draw of about 20% from the optimal level of amperage draw can be used as an indication that additional coating should be added. In other embodiments a decrease of about 10% to about 30% can be used to determine that additional coating should be added. In still further embodiments, the percent of decrease utilized can further vary to accommodate numerous variables, such as the type of coating used and the product type.

Further, referencing FIG. 11, the coating (drag) belt 46 includes a plurality of flights 47. In one embodiment, the flights 47 are hingedly connected to the belt wherein the hinges include one or more passages to allow the coating to flow therethrough, particularly when the hinges are positioned about the top coating distribution passage 60 and the recycle assembly 8 is tilted off the horizon. In other embodiments, the passages can be located in positions other than the hinges, or not included at all. An exemplary belt that can be used on the apparatus 2 is a Uni-belt/chain Part No. 24PPPP4V36W, as manufactured by Ammeraal Beltech Modular, Inc. of Reading, Pa., having flights that are about 4 inches high by about 6 inches wide and spaced about 6 inches apart, although in other embodiments, the belt 46 and flights 47 can be dimensioned to accommodate the desired shape of the channel 44.

Further referring to FIG. 11, the flights 47 in the coating (drag) belt 46 define moving compartments 52 in the channel 44, for transporting coating. The flights 47 can vary in size to accommodate the transport of more or less coating. Further, the flights 47 can be oriented at various angles with respect to channel 44, although in one embodiment the flights 47 are oriented perpendicular to an outer wall surface 49 of the channel 44.

In addition, the channel 44 includes various passages for distributing the coating situated in the compartments 52. In at least one embodiment, the channel 44 includes a drain passage (not shown), the base coating distribution passage 58, and the at least one top coating distribution passage 60. The drain passage is located along an ascending portion 64 of the recycle assembly 8 and can be opened to allow the coating in the channel 44 to drain through the drain passage as the belt 46 rotates. The draining of the coating allows for efficient cleaning of the recycle assembly 8 post-process.

The base coating distribution passage 58 is situated on the descending portion 62 of the recycle assembly 8 and can include a metering gate (not shown), such as an adjustable slide cover secured to the bottom of the base coating distribution passage 58 to meter the flow of coating through the base coating distribution passage 58. The top coating distribution passage 60 can include the metering gate 70, such as an adjustable slide cover, secured to the bottom of the top coating distribution passage 60. In addition, the top chute 72 is situated below the top coating distribution passage 60 to funnel coating towards the wire belt 16, more particularly, to the top of the food product situated on the wire belt 16. The top chute 72 can include one or more sheets of material, such as stainless steel, bent or fastened to at least partially enclose and convey coating. Although the various passages are shown in specific locations about the channel 44, in other embodiments, they can be located in various other positions to accommodate specific uses.

Still referring to FIG. 11, the top coating distribution passage 60 can further include a biasing portion (not shown), such as an angled plate, that extends at least partially along the length of the top coating distribution passage 60 to provide a graduated opening. The biasing portion decreases in width along the length of the top coating distribution passage 60 in the direction of rotation of the coating (drag) belt 46, such that the top passage opening 57 of the top coating distribution passage 60 increases in size in the direction of rotation, thereby providing a substantially even flow and distribution of coating from the top coating distribution passage 60 down the top chute 72 and onto the food products.

Referring again to FIG. 5, the recycle assembly 8 includes a center plane 78 through the channel 44, wherein the center plane 78 is situated at an angle α with respect to a horizontal plane 80. In at least one embodiment, angle α is about 68 degrees, although in other embodiments the angle α can range from about 55 degrees to about 85 degrees, while in some other embodiments the angle α can range from about 35 degrees to about 85 degrees. The recycle assembly 8 is situated in the aforementioned angle α range to provide a short profile apparatus, as increasing angle α results in reducing the overall length of the apparatus 2 and thereby provides for a smaller apparatus 2 footprint, and therefore a smaller space to accommodate the apparatus 2.

The recycle assembly 8 in at least one embodiment provides, at least in part, for the application of coating to a top portion of a product moving along the wire belt 16, in particular, along the horizontal portion 34. In at least some embodiments, coating is provided for application to both the top and the bottom portion of the product. To facilitate this, the feed assembly 6 is provided to coat the wire belt 16 about the ramp portion 32, thereby providing a layer of coating on the wire belt 16 prior to receipt of the food product on the wire belt 16. The feed assembly 6 is depicted in a side view in FIG. 5 and, at least in part, in FIGS. 6, 7, and 11.

The feed assembly 6 is situated at the input side 10 of the belt assembly 4 and receives coating from the recycle assembly 8 via the base coating distribution passage 58. The feed assembly 6 includes the base hopper 82 (FIG. 7), which serves to funnel the coating received from the base coating distribution passage 58 into a base channel 94 for distribution about the wire belt 16. As shown, the base channel 94 forms an oblong circle, although in other embodiments, the channel 94 can form various other shapes to accommodate, such as a square, etc. In at least one embodiment, coating that is received in the base channel 94 is conveyed by a base drag belt 96 and base flights 97 along a base distribution port 98 (FIG. 5), the base distribution port 98 distributing the coating across the wire belt 16 in at least a partially uniform manner. The base channel 94 includes a base channel side wall 100 for at least partially enclosing the base channel 94. In at least one embodiment, the base drag belt 96 and flights 97 can be similar in design and function to the drag belt 46 and flights 47 described and shown with reference to the recycle assembly 8.

The base channel 94 includes base sides 95 and the base distribution port 98, with the base distribution port 98 including a biasing portion (similar in function to the biasing portion 90 in FIG. 2) that serves to vary the width of a base opening 99 of the base distribution port 98. The biasing portion extends at least partially along the length of the base distribution port 98, wherein the biasing portion decreases in width, such that the base opening 99 increases in size as the base channel 94 extends away from the base hopper 82 along the wire belt 16. As the coating is transported along the base channel 94 by the drag belt 96, it is dispersed through the base opening 99 in the base distribution port 98 and onto the wire belt 16. As the coating is dispersed, the amount of coating positioned between each pair of flights 47 decreases as the base drag belt 96 rotates along the length of the base distribution port 98, and due to the biasing portion progressively widening the base opening 99, a substantially even flow of coating can be dispersed from the base distribution port 98 along the substantial width of the wire belt 16. In at least some embodiments, the flow of coating along the length of the base distribution port 98 can provide a substantially uniform layer of coating for the food product to be received upon the wire belt 16, although in other embodiments the dispersion of coating from the base distribution port 98 can be substantially non-uniform. In addition, an adjustable base metering gate 102 (FIG. 5) can be provided, which is hingedly secured to the base side 55 about a pivot 104. The base metering gate 102 can be adjusted to provide a linear partial barrier across the width of the wire belt 16, with a pre-set distance between a gate bottom 106 and the wire belt 16. This distance serves to provide a substantially uniform desired depth of coating along the wire belt 16 prior to receipt of the product thereon. In this manner, a consistent layer of coating is provided for application to the product.

In an exemplary operation, the recycle assembly 8 is charged by placing coating in the channel 44. Upon activation of the coating (drag) belt 46, the coating is transported by the compartments 52 to the base coating distribution passage 58 and the top coating distribution passage 60. The coating is then available to the food products for at least one of a base coat and a top coat. To provide a base coat, the base coating distribution passage 58 is opened, thereby allowing the coating to be dispersed through the base coating distribution passage 58 and into the base hopper 82 where the coating is then transported by the base drag belt 96 along the base channel 94 for dispersal at the base distribution port 98, along the width of the wire belt 16 above the ramp portion 32. The base coating is then transported on the wire belt 16 from the input end 10 towards the output end 12.

After the wire belt 16 has been provided with a layer of coating, food products are deposited onto the wire belt 16, typically above the ramp portion 32. The food products and coating travel on the wire belt 16 along the ramp portion 32 and proceed along the horizontal portion 34 of the support bottom 22, where they pass underneath the top chute 72. When coating is desired on the top portion of the food products, coating from the compartments 52 is dispersed through the top coating distribution passage 60 and descends along the top chute 72 and onto the food products, thereby providing the top coating. The food products continue on the wire belt 16 along the horizontal portion 34, where they pass under the pat down rollers 28, which apply pressure to the food product and coating, thereby pressing the coating firmly onto the food product surface, to increase retention.

After passing under the pat down rollers 28, the support bottom 22 terminates as discussed above, although the wire belt 16 continues towards the output end 12. With the support bottom 22 no longer situated under the wire belt 16, the coating that is not adhered to the food products descends through the wire belt 16 and into the discharge chute 40. In addition, coating that was being dragged along under the wire belt 16 on the top surface of the support bottom falls into the discharge chute 40. Additionally, to aid in the removal of excess coating from the food products and the wire belt 16, the wire belt 16 is lifted and dropped by the agitation roller 26, thereby shaking loose excess coating and allowing it to fall off the food product and through the wire belt 16. Further, the blow off tubes 27 can be utilized to further encourage the dispersion of excess coating from the food products and to push the coating through the wire belt 16.

As discussed above, excess coating is received by the discharge chute 40, where the discharge chute 40 is situated at a downward angle to utilize gravity to funnel the coating into the lower length 42 of the recycle assembly 8 for subsequent transport to at least one of the top chute 72 and the base hopper 82. In at least some embodiments, forces other than gravity can be utilized to move the coating down the discharge chute 40, for example, a vibratory means. The recycle assembly 8 and feed assembly 6 provide a conveying system that substantially reduces the pulverization of the coating that can occur with traditional methods, such as dragging the coating against a rigid member under a drag belt from an outlet end to an inlet end, or transporting the coating through a multitude of auger-type conveyors. The reduced pulverization forces allow for more fragile coatings to be used.

In an exemplary embodiment, all of the components and sub-components of the apparatus 2 can be formed from metal, such as stainless steel, although it has been contemplated that other materials may be used such as plastic or mild steel with a plastic coating. In addition, the apparatus 2 can be powered with hydraulic motors, electric motors, or a combination of the two. Further, the apparatus 2 can be configured to be wider or narrower to accommodate space constraints and food production capacity requirements. Additionally, the numerical ranges in this disclosure are approximate, and thus may include values outside of the range unless otherwise indicated. Further, all of the hydraulic and electronic components discussed herein can be controlled by a programmable device such as a programmable logic controller (PLC) or can be provided with various manual or automatic discreet controls, for example hand operated starters and drive controllers.

While this apparatus and method has been described in conjunction with the exemplary embodiments outlined above, various alternatives, modifications, variations, improvements, and/or substantial equivalents, whether known or that are or may be presently unforeseen, may become apparent to those having at least an ordinary skill in the art. In addition, although numerous features may be shown and described with reference to only one embodiment, these features may be included for use with, or omitted from, one or more other embodiments. Accordingly, the exemplary embodiments of the apparatus as set forth above are intended to be illustrative, not limiting. Various changes may be made without departing from the spirit and scope of the apparatus. Therefore, the apparatus is intended to embrace all known or earlier developed alternatives, modifications, variations, improvements and/or substantial equivalents.

What is claimed is:

1. A device for applying food coating including:
   a. a food product belt assembly having an input end and an output end, the food product belt assembly being configured to convey food products from the input end to the output end, and
   b. a recycle assembly, capable of receiving excess coating from adjacent the output end of the food product belt assembly and conveying the excess coating for dispersal adjacent the input end, wherein the recycle assembly includes:
      (1) a flexible coating belt extending at least partially around the food product belt assembly, and
      (2) a coating distribution passage situated between the coating belt and the food product belt assembly, whereby excess coating is provided from the coating belt through the coating distribution passage for application to a food product situated on the food product belt assembly.

2. The device of claim 1 wherein the coating belt travels along a path situated in planes oriented between about 55 degrees to about 85 degrees with respect to a horizontal plane.

3. The device of claim 1 wherein the coating distribution passage is adjustable to meter the flow of coating therethrough.

4. The device of claim 1 further including a feed assembly:
   a. situated to receive coating from the coating distribution passage, and
   b. configured to convey the received coating across a belt assembly width of the food product belt assembly, the belt assembly width being oriented perpendicularly of a belt assembly length defined between the input and output ends.

5. The device of claim 4 wherein the feed assembly further includes a conveyor having a length:
   a. at least partially bounded by walls of a base channel wherein the conveyor is situated, and
   b. extending across the belt assembly width of the food product belt assembly.

6. The device of claim 5 wherein the conveyor includes a belt rotating about axes oriented more vertically than horizontally.

7. The device of claim 5 wherein the food product belt assembly further includes a wire belt situated to:
   a. receive coating from the base channel at a location adjacent the input end, and
   b. subsequently receive food product at a location spaced further from the input end, thereby providing an application of coating to a bottom portion of the food product.

8. The device of claim 1 further including a top chute positioned at least partially below and adjacent to the coating distribution passage, the top chute having one or more surfaces extending towards the food product belt assembly for directing coating from the coating distribution passage to the top of the food product.

9. The device of claim 1 further including a discharge chute positioned at least partially underneath the food product belt assembly for receiving coating not adhered to the food product, the discharge chute having one or more surfaces extending at least partially between:
   a. the output end of the food product belt assembly, and
   b. the coating belt of the recycle assembly,
to direct coating to the coating belt.

10. The device of claim 1 wherein the food product belt assembly further includes:
    a. a wire belt rotating between the input and output ends,
    b. one or more rollers situated above the wire belt for applying pressure at the top surface of the food product and
    c. one or more cams positioned about a belt assembly width of the food product belt assembly for agitating the food product via the wire belt to persuade excess coating to pass through the wire belt, the belt assembly width being oriented perpendicularly of a belt assembly length defined between the input and output ends.

11. The device of claim 1 wherein the distance between the input and output ends does not exceed about 4 feet.

12. The device of claim 1 wherein the coating belt extends from:
    a. a location below the output end, to
    b. a location above the input end.

13. The device of claim 1 wherein the coating belt rotates about axes oriented more vertically than horizontally.

14. The device of claim 1 wherein the coating belt bears flights thereon, with the flights traveling adjacent:
    a. a channel wall opposite the coating belt, and
    b. a channel floor extending between the belt and the channel wall.

15. A device for applying food coating including:
    a. a food product belt assembly having an input end and an output end, the food product belt assembly being configured to convey food products from the input end to the output end, and
    b. a recycle assembly, capable of receiving food product coating not adhered to the food products from adjacent the output end of the belt assembly and conveying the food product coating for dispersal to the food products at the input end, the recycle assembly including a coating belt configured to convey unadhered food product coating upwardly, the coating belt travelling along a path:
       (1) extending from locations adjacent the input and output ends, and
       (2) situated in planes oriented between about 55 degrees to about 85 degrees with respect to a horizontal plane.

16. The device of claim 15 wherein the recycle assembly includes a coating distribution passage situated between the coating belt and the food product belt assembly, whereby excess coating is provided from the coating belt through the coating distribution passage for application to the food products situated on the food product belt assembly.

17. The device of claim 15 wherein the distance between the input and output ends does not exceed about 4 feet.

18. The device of claim 15 wherein the coating belt rotates about axes oriented more vertically than horizontally.

19. The device of claim 15 wherein the coating belt bears flights thereon, with the flights traveling adjacent:
 a. a channel wall opposite the coating belt, and
 b. a channel floor extending between the belt and the channel wall.

20. The device of claim 15 wherein at least a portion of the food product belt assembly is situated within the coating belt.

21. The device of claim 15 wherein the coating belt extends from:
 a. a location below the output end, to
 b. a location above the input end.

22. A device for applying food coating including:
 a. a food product belt assembly having a belt assembly length extending between an input end and an output end, the food product belt assembly being configured to convey food products from the input end to the output end;
 b. a coating belt:
  (1) having opposing lengths traveling:
   i. in opposite directions, and
   ii. transversely with respect to the belt assembly length,
  (2) bearing spaced flights thereon,
  (3) traveling within a channel, the channel including:
   i. a channel wall opposite the coating belt, with the flights extending between the coating belt and the channel wall, and
   ii. a channel floor extending between the coating belt and the channel wall, with the flights extending adjacent the channel floor, with adjacent ones of the flights defining compartments within the channel,
 wherein the device is configured to pass coating between the channel and the food product belt.

23. The device of claim 22 wherein at least a portion of the food product belt assembly is situated within the coating belt.

24. The device of claim 22 wherein the coating belt extends from:
 a. a location below the output end, to
 b. a location above the input end.

25. The device of claim 22 wherein the distance between the input and output ends does not exceed about 4 feet.

26. The device of claim 22 wherein the channel has a coating passage defined therein, wherein the device is configured to supply coating through the coating passage between the channel and the food product belt.

27. The device of claim 26 wherein the device is also configured to supply coating from the food product belt to the channel.

28. The device of claim 22 wherein the coating belt rotates about axes oriented at least 5 degrees with respect to a horizontal plane.

\* \* \* \* \*